US010686382B2

(12) United States Patent
Bianco et al.

(10) Patent No.: US 10,686,382 B2
(45) Date of Patent: Jun. 16, 2020

(54) SYMMETRIC TIME SHIFT CONTROL FOR RESONANT CONVERTERS

(71) Applicant: STMICROELECTRONICS S.R.L., Agrate Brianza (IT)

(72) Inventors: Alberto Bianco, Gressan (IT); Marco Dell'Oro, Olginate (IT); Giuseppe Scappatura, Aosta (IT); Luca Longhi, Travaco' Siccomario (IT); Matteo Sucameli, Monza (IT); Dino Ciambellotti, Cusano Milanino (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 217 days.

(21) Appl. No.: 15/399,335

(22) Filed: Jan. 5, 2017

(65) Prior Publication Data
US 2018/0191252 A1   Jul. 5, 2018

(51) Int. Cl.
*H02M 3/335*     (2006.01)
*H02M 1/08*      (2006.01)
(Continued)

(52) U.S. Cl.
CPC ......... *H02M 3/33507* (2013.01); *H02M 1/08* (2013.01); *H02M 3/3376* (2013.01);
(Continued)

(58) Field of Classification Search
CPC ............ Y02B 70/1433; Y02B 70/1441; Y02B 70/1466; H02M 2007/4815;
(Continued)

(56) References Cited

U.S. PATENT DOCUMENTS 5,073,849 A    12/1991  Morris
8,699,240 B2    4/2014  Adragna et al.
(Continued)

FOREIGN PATENT DOCUMENTS

CN    102163919 A    8/2011
CN    102201754 A    9/2011

OTHER PUBLICATIONS

Adragna et al., "Digital Implementation and Performance Evaluation of a Time-Shift-Controlled LLC Resonant Half-Bridge Converter," 29th Annual IEEE Applied Power Electronics Conference and Exposition (APEC), Mar. 16-20, 2014, pp. 2074-2080.

*Primary Examiner* — Gary L Laxton
*Assistant Examiner* — Kevin H Sprenger
(74) *Attorney, Agent, or Firm* — Seed IP Law Group LLP

(57) ABSTRACT

A control circuit controls a switching circuit of a resonant converter where the switching circuit includes first and second power switches. A first on time of the first power switch and a second on time of the second power switch are controlled to generate a square wave signal to drive the resonant circuit. The control circuit controls the first on time based on a zero current detection time indicating detection of a zero current crossing of a resonant current generated in the resonant circuit in response to the square wave signal and on a time shift delay time based on an output voltage of the resonant converter. The second on time of the second power switch control is based on the zero current detection time detected for the first power switch and on the time shift delay time.

25 Claims, 10 Drawing Sheets

(51) Int. Cl.
*H02M 3/337* (2006.01)
*H02M 1/00* (2006.01)

(52) U.S. Cl.
CPC .............. *H02M 3/33569* (2013.01); *H02M 2001/0009* (2013.01); *H02M 2001/0054* (2013.01); *Y02B 70/1433* (2013.01); *Y02B 70/1491* (2013.01)

(58) Field of Classification Search
CPC . H02M 2001/0012; H02M 2001/0032; H02M 2001/0009; H02M 3/33507; H02M 3/33569; H02M 3/3385; H02M 3/156; H02M 3/1588; H02M 3/1584; H02M 3/158; H02M 3/157; H02M 3/1563; H02M 3/3376; H02M 2001/0054; H02M 1/08
USPC .................. 363/21.02–21.03; 323/282–288
See application file for complete search history.

(56) References Cited

U.S. PATENT DOCUMENTS

| | | |
|---|---|---|
| 8,773,872 B2 | 7/2014 | Adragna |
| 9,166,481 B1 | 10/2015 | Vinciarelli et al. |
| 2011/0157927 A1 | 6/2011 | Adragna et al. |
| 2012/0250362 A1* | 10/2012 | Chen ............... H02M 1/4258 363/21.03 |
| 2013/0070372 A1* | 3/2013 | Koo ................. H02M 3/3376 361/18 |
| 2014/0286056 A1* | 9/2014 | Yoon ................ H02M 3/33569 363/21.03 |
| 2015/0229219 A1 | 8/2015 | Choi |
| 2016/0057822 A1* | 2/2016 | Chu .................. H02M 1/4208 315/201 |
| 2017/0012538 A1* | 1/2017 | Barrenscheen ... H02M 3/33507 |
| 2017/0155333 A1* | 6/2017 | Chen ..................... H02M 1/08 |

* cited by examiner

SYMMETRIC TIME SHIFT CONTROL FOR RESONANT CONVERTERS

BACKGROUND

Technical Field

The present disclosure relates generally to switching power converters and more specifically to the control of resonant converters.

Description of the Related Art

Resonant converters are a type of switching power converter characterized by the presence of a resonant circuit playing an active part in determining the input-output power flow of the converter. In these resonant converters a bridge circuit, which is either a half-bridge circuit or a full-bridge circuit, receives an input voltage and, in response to control signals applied to power switches in the bridge circuit, generates a voltage square wave that is applied to a resonant circuit tuned to a frequency close to the fundamental frequency of the voltage square wave. Because of the selective frequency characteristics of the resonant, the resonant circuit mainly responds to this fundamental frequency component of the voltage square wave while responding negligibly to higher-order frequency components or harmonics of the voltage square wave. Through these variable frequency characteristics of the resonant circuit, the circulating power of the resonant converter may be modulated by changing the frequency of the voltage square wave while maintaining a fifty percent (50%) duty cycle of the voltage square wave. In response to the fundamental frequency component of the voltage square wave, sinusoidal or piecewise sinusoidal voltages and currents at this frequency flow in the resonant circuit. These sinusoidal voltages and currents are then rectified and filtered to provide direct current (DC) output power that is supplied to a load coupled to the resonant converter.

A typical resonant converter includes a transformer that provides isolation between the input voltage and the load, and includes a primary winding that is part of the resonant circuit and is coupled to the bridge circuit. A secondary winding or windings form part of rectification circuitry that is coupled to supply power through filtering circuitry to the load. In relation to the primary and secondary sides of the transformer, the resonant converter is said to have a primary side that includes the bridge circuit and resonant circuit and a secondary side that includes the rectification circuitry and filter circuitry coupled to the load. There are many types of resonant converters, with the so-called "LLC resonant converter" being one of the most widely used types of resonant converter. The LLC designation comes from the fact that this resonant circuit includes two inductive components (L) and a capacitive component (C), where the primary winding of the transformer may contribute one of the two inductive components or both inductive components.

Resonant converters generally and LLC resonant converters specifically have many advantages compared to traditional non-resonant type switching power converters, such as pulse width modulated (PWM) switching power converters. PWM switching power converters modulate the pulse width or duty cycle of PWM control signals to control output power provided by the converter. In comparison to PWM switching power converters, resonant power converters operate with wave forms without steep edges, realize low switching losses of power switches due to "soft" switching of such power switches, provide high conversion efficiency, operate at high frequencies, and provide low Electro Magnetic Interference (EMI) generation and high power density, as will be appreciated by those skilled in the art.

Multiple control methods for controlling the operation of LLC resonant converters are known in the art. In controlling the circulating power of an LLC resonant converter, the frequency of the voltage square wave provided by the bridge circuit is modulate while maintaining a fifty percent duty cycle of the voltage square wave. This control approach is termed the Direct Frequency Control (DFC) method and may be considered the industry standard control method for LLC resonant converters. The DFC method has drawbacks and one alternative to the DFC method, which is known as the Time Shift Control (TSC) method, addresses one of the major issues associated with the DFC method. This major issue with the DFC method is that when this control method is utilized, the LLC resonant converters frequency characteristics include a transfer function having multiple poles whose frequency depend on operating conditions of the LLC resonant converter. This complicates the analysis and control of LLC resonant converters through the DFC method. Issues associated with the control of converters based on PWM and DFC based control are discussed in more detail in U.S. Pat. No. 8,773,872, which is incorporated herein by reference in its entirety. The TSC method addresses this issue with the DFC method in that when an LLC resonant converter is controlled through the TSC method the LLC resonant converter behaves as a single pole system, allowing higher bandwidth compensation and a higher input voltage ripple rejection. While the TSC method provides these advantages over the conventional DFC method control, different issues arise with this control approach, and therefore improved control methods are needed for controlling LLC resonant converters specifically and resonant converters generally.

BRIEF SUMMARY

In one embodiment of the present disclosure, a control circuit controls a switching circuit of a resonant converter where the switching circuit includes first and second power switches. A first on time of the first power switch and a second on time of the second power switch are controlled to generate a square wave signal to drive the resonant circuit. The control circuit controls the first on time based on a zero current detection time indicating detection of a zero current crossing of a resonant current generated in the resonant circuit in response to the square wave signal and on a time shift delay time based on an output voltage of the resonant converter. The second on time of the second power switch control is based on the zero current detection time detected for the first power switch and on the time shift delay time.

BRIEF DESCRIPTION OF THE DRAWINGS

The features and advantages of the present disclosure will be apparent from the following detailed description of embodiments thereof, shown by way of non-limiting example in the accompanying drawings, in which.

DETAILED DESCRIPTION

Figure 1:
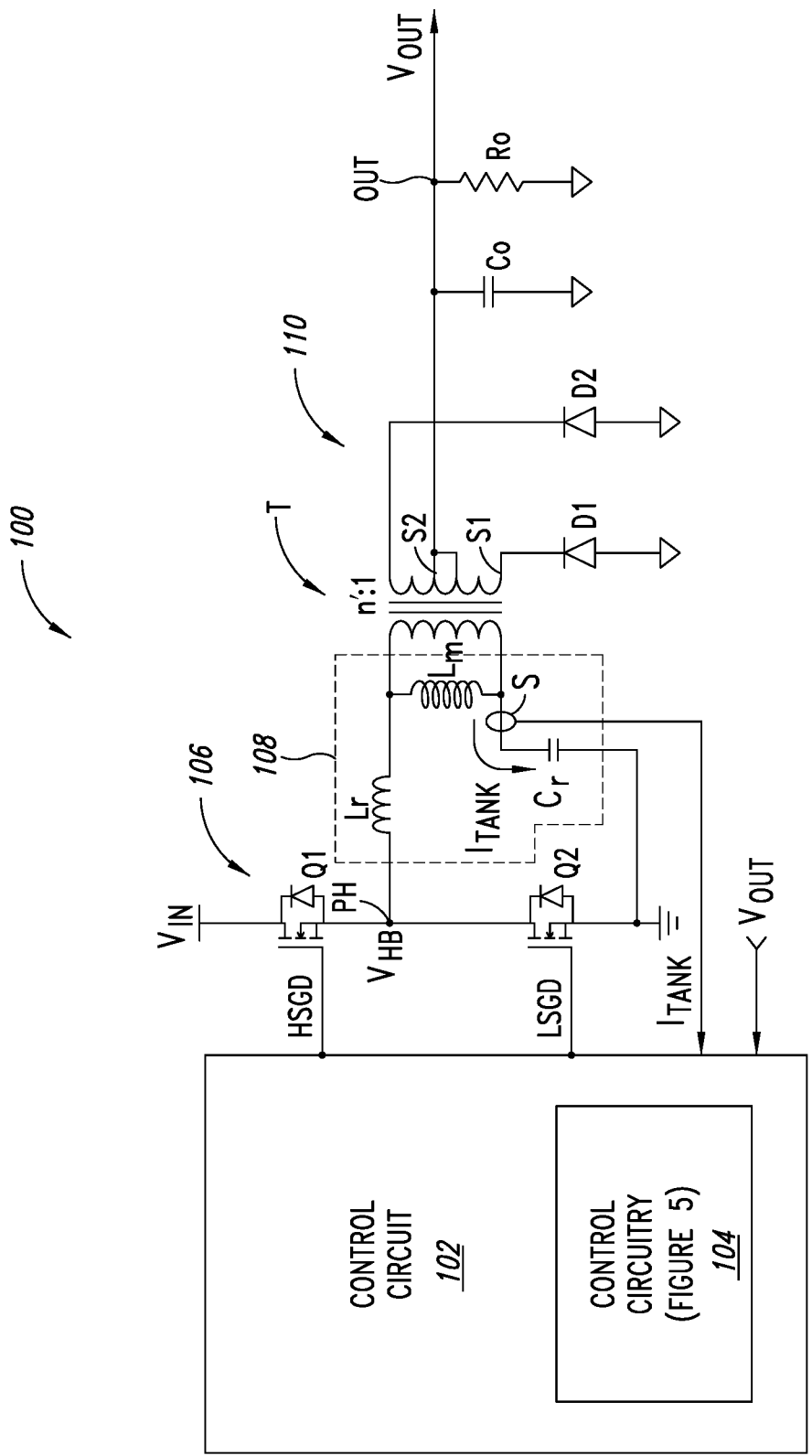
FIG. 1 is a schematic diagram of an LLC resonant converter including symmetric time shift control circuitry according to on embodiment of the present disclosure.

FIG. 1 is a schematic diagram of an LLC resonant converter 100 including a control circuit 102 having time shift control circuitry 104 to provide time shift control (TSC) or symmetric time shift control (STSC) to control the operation of the resonant converter according to one embodiment of the present disclosure. In operation during an STSC mode, STSC circuitry (not shown in FIG. 1) in the time shift control circuitry 104 compensates for a lack of symmetry or "unbalance" in the detection of zero current crossings of a tank current $I_{TANK}$ generated during operation of the resonant converter 100. The detections of zero current crossings of the $I_{TANK}$ current are a necessary part of the time shift control (TSC) method of controlling resonant converters, as will be discussed in more detail below. In the STSC mode, the time shift control circuitry 104 eliminates unbalances in the detection of zero current crossings of the $I_{TANK}$ current by making symmetric times utilized in the time shift control of the resonant converter 100 that are based upon detection of these zero current crossings, as will also be explained in more detail below.

In the present description, certain details are set forth in conjunction with the described embodiments to provide a sufficient understanding of the present disclosure. One skilled in the art will appreciate, however, that embodiments of the disclosure may be practiced without these particular details. Furthermore, one skilled in the art will appreciate that the present disclosure is not limited to the example embodiments described herein, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail to avoid unnecessarily obscuring the present disclosure. Finally, components that are common among the described embodiments are given the same reference numbers or descriptors in the present application even though the detailed operation of such components may vary slightly among the different embodiments.

The theory and overall operation of LLC resonant converters such as the LLC resonant converter 100 of FIG. 1 is well understood by those skilled in the art, and thus will not be described in detail herein. Instead, the overall operation of the LLC resonant converter 100 will only briefly be described before describing in more detail the conventional time shift control method, which will then be followed by a detailed description of the symmetric time shift control of the resonant converter according to embodiments of the present disclosure. The primary side of the LLC resonant converter 100 includes a switching circuit 106, which is a half-bridge circuit formed by series-connected power switches Q1 and Q2 in the embodiment of FIG. 1. The switches Q1 and Q2 are power MOSFETs in the embodiment of FIG. 1 and are coupled between a supply voltage node receiving a supply voltage VIN and a reference voltage node receiving a reference voltage, which is ground in the embodiment of FIG. 1. The control circuit 102 generates a high-side gate drive signal HSGD and a low-side gate drive signal LSGD to drive the gates of the switches Q1 and Q2, respectively, and thereby generate a phase voltage signal VHB on a phase node PH defined between the interconnection of the switches Q1 and Q2.

The primary side of the LLC resonant converter 100 further includes a resonant circuit 108 coupled between the phase node PH and the reference node. This resonant circuit includes a series-connected resonant inductor Lr, a magnetizing inductance Lm of a transformer T and a resonant capacitor Cr. The secondary side of the LLC resonant converter 100 includes a rectification circuit 110 that rectifies an output current that is equal to the tank current $I_{TANK}$, which is the resonant current in the resonant tank circuit 108, minus a current $I_{Lm}$ through the magnetizing inductance Lm to generate a DC output voltage VOUT on an output node OUT. The rectification circuit 110 includes two center tapped secondary windings S1 and S2 of the transformer T coupled to two diodes D1 and D2 as shown, with the center tap of these two secondary windings being coupled to the output node OUT. FIG. 1 illustrates a primary model of the transformer T in which the contributions of all components in the transformer are related to or are with respect to the primary side of the transformer. Thus, the resonant inductor Lr and magnetizing inductance Lm represent both an inductance Lp of a primary winding and inductances LS1 and LS2 of the secondary windings S1, S2 of the transformer T, and the transformer has a turns ratio n':1 instead of a turns ratio n:1 of an ideal transformer, as will be appreciated by those skilled in the art.

An output capacitor C0 and an output load, which is represented as a resistor R0, are coupled across the output node OUT to filter the rectified signal generated on the output node OUT and generate the DC output voltage VOUT provided by the LLC resonant converter. Although the rectification circuit 110 includes two diodes D1 and D2 in the embodiment of FIG. 1, in other embodiments the rectification includes, in place of these diodes, synchronous rectification switches such as MOSFETs and a synchronous rectification controller that controls the operation of these synchronous rectification switches, as will be appreciated by those skilled in the art. In one embodiment, the resonant inductor Lr and magnetizing inductance $L_m$ are integrated in a single transformer structure.

In operation, the control circuit 102 controls the switching circuit 106 to generate the HSGD and LSGD signals in a complementary manner to drive the power switches Q1 and Q2 alternately with a fifty percent duty cycle for each power switch. In this way, the switching circuit 106 functions as a square wave generator to generate a square wave signal as the phase voltage signal VHB on the phase node PH. The resonant inductor Lr, capacitor Cr and magnetizing inductor Lm form the resonant circuit 108 and the fundamental frequency of the VHB signal generates a sinusoidal or piecewise sinusoidal resonant current or tank current $I_{TANK}$ in the resonant circuit. The frequency of the VHB signal thus determines the gain of the tank element and generating of the output voltage VOUT. In this way, the control circuit 102 controls the switching circuit 106 to control the frequency of the generated VHB signal and thereby adjust the value of the generated output voltage VOUT.

In the embodiment of FIG. 1, the transformer T is center tap transformer including the secondary windings S1 and S2. Transformer configurations other than center tap configurations may be used in further embodiments of the present disclosure. In addition, although the rectification circuit 110 includes diodes D1 and D2 in the embodiment of FIG. 1, the rectification circuit similarly may have different structures in additional embodiments of the present disclosure. For example, where the transformer T is other than a center tap transformer the rectification circuit 110 may have a different structure. Even where the transformer T is a center tap transformer as in the embodiment of FIG. 1, the rectification circuit 110 may have a different structure such as the inclusion of synchronous rectification switches in place of the diodes D1 and D2.

Figure 2:
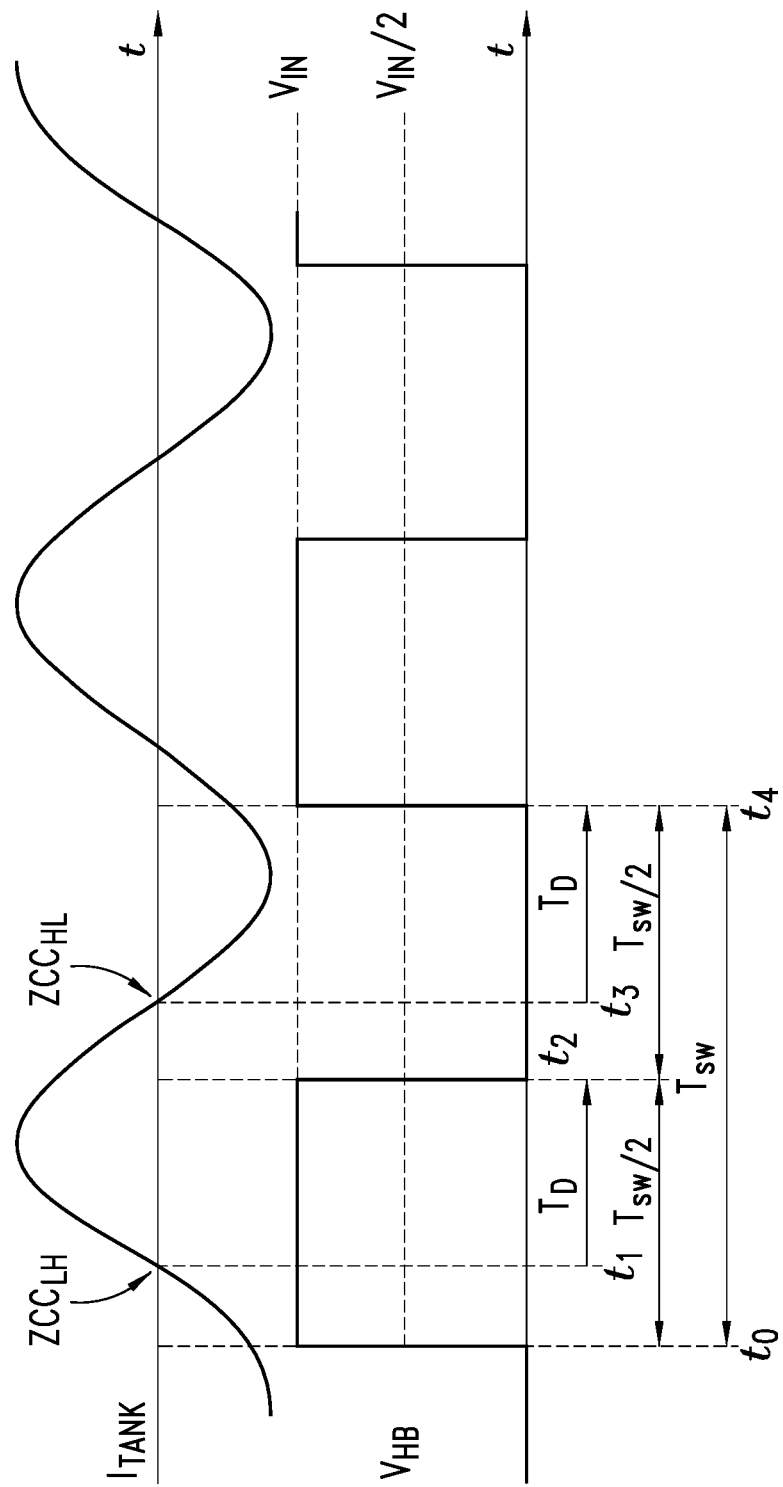
FIG. 2 is a signal timing diagram showing the tank current and phase voltage signal that would be generated by the control circuit of the LLC resonant converter of FIG. 1 under conventional time shift control of the LLC resonant converter.
Figure 3:
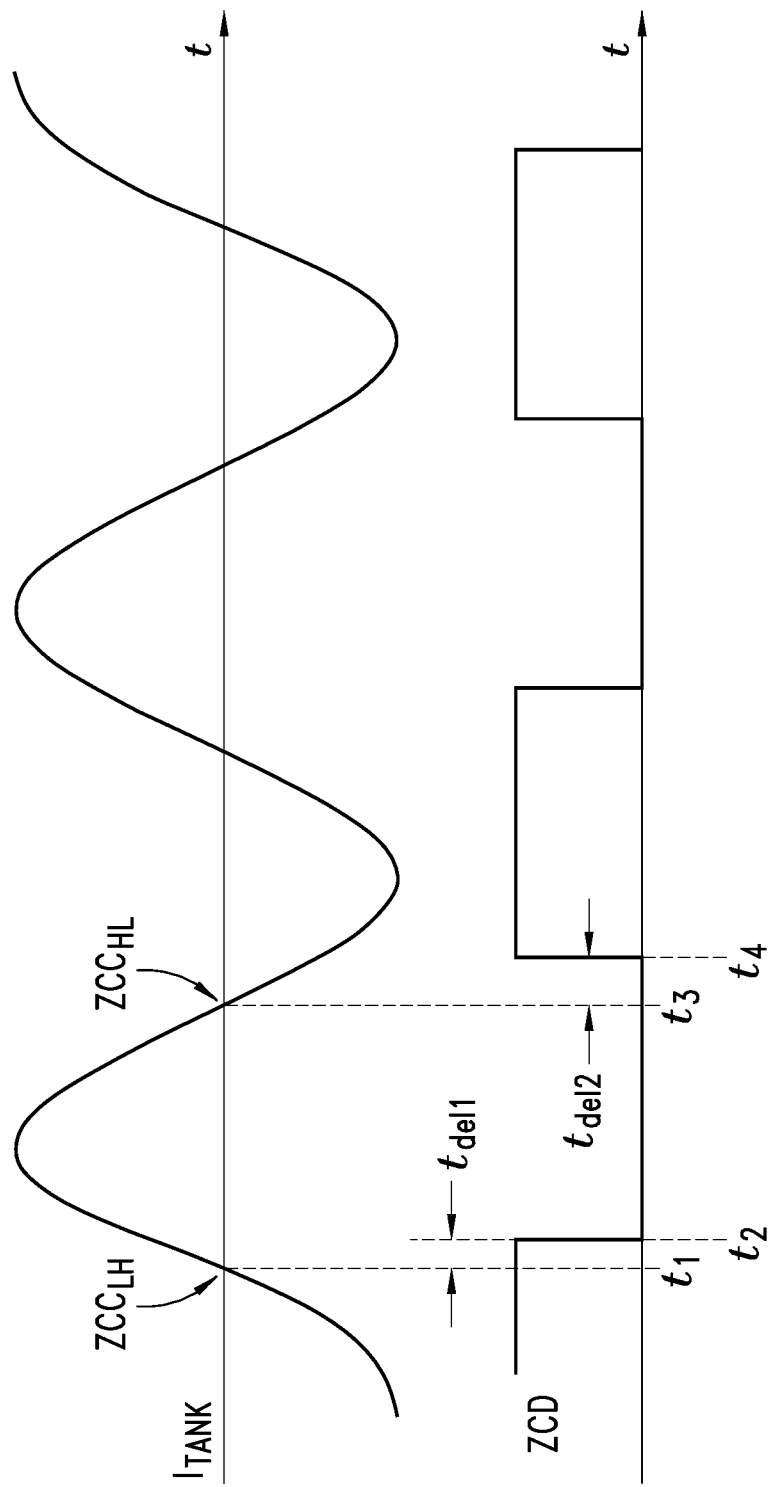
FIG. 3 is a signal timing diagram illustrating the effects of unbalanced or asymmetric operation in detecting zero current crossings under conventional time shift control of an LLC resonant converter as illustrated in FIG. 2.

Before discussing in detail the operation of the symmetric time shift control circuitry 104 in implementing symmetric time shift control (STSC) in the LLC resonant converter 100 according to embodiments of the present disclosure, conventional time shift control (TSC) of a resonant converter will first be discussed with reference to FIGS. 2 and 3. As previously mentioned, multiple control methods for controlling the operation of LLC resonant converters are known in the art. The Direct Frequency Control (DFC) method is the industry standard control method for LLC resonant converters while the TSC method has the advantage that the LLC resonant converter behaves as a single pole system under this control approach. FIG. 2 is a signal timing diagram showing the tank current $I_{TANK}$ and phase voltage signal VHB that would be generated according to conventional time shift control. FIG. 3 is a signal timing diagram illustrating the effects of unbalanced or asymmetric operation in detecting zero current crossings under conventional time shift control of an LLC resonant converter as illustrated in FIG. 2.

Figure 4:
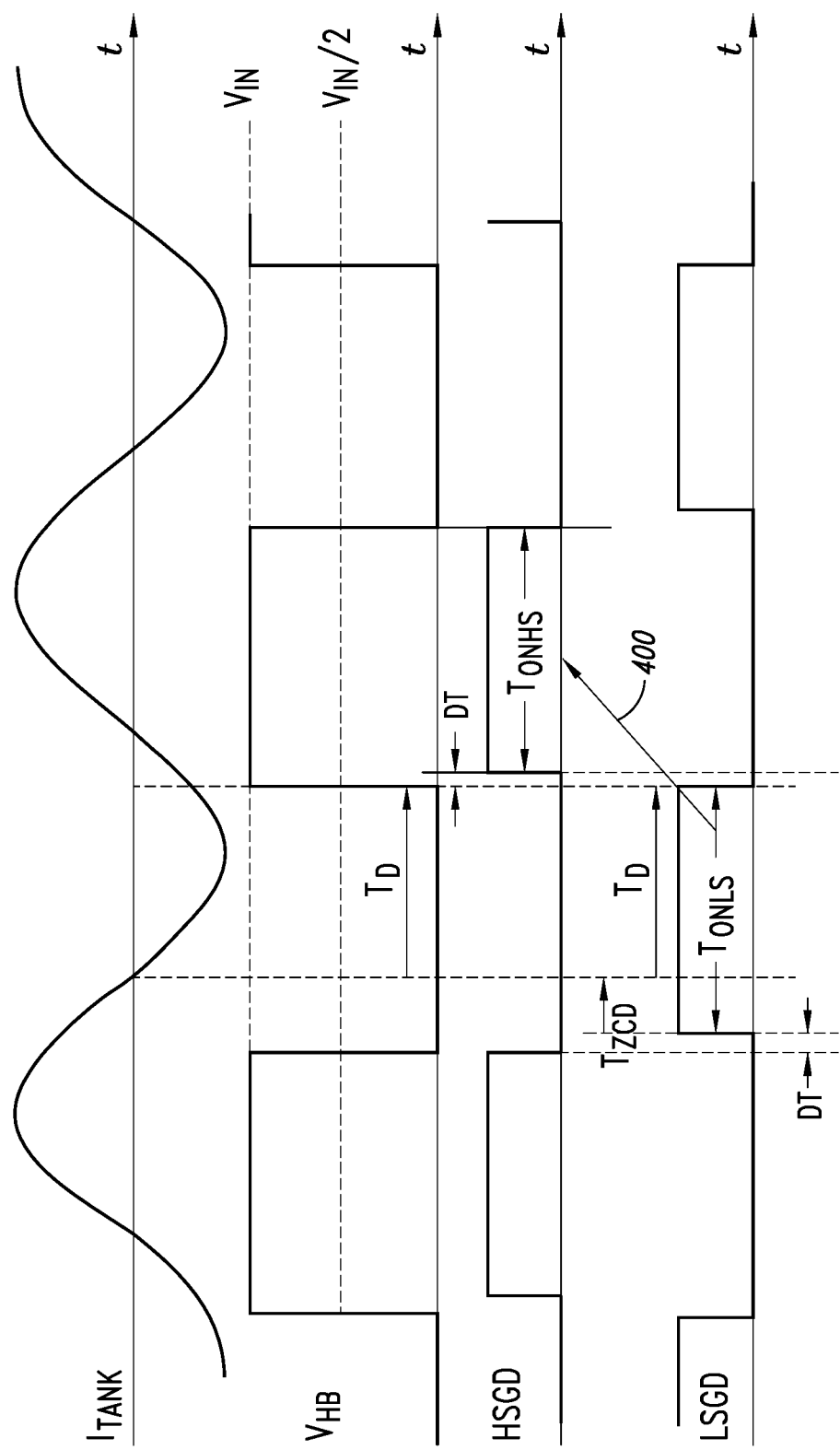
FIG. 4 is a signal timing diagram illustrating signals generated in the LLC resonant converter of FIG. 1 when the symmetric time shift control circuitry implements symmetric time shift control according to one embodiment of the present disclosure.

Referring to FIG. 2, in time shift control (TSC), which may also be referred to as "the TSC method" or "TSC operation" in the present description, the control circuitry of the resonant converter controls switching of the switching circuit (half-bridge or full-bridge circuit) based on a "time shift" or "time shift delay time" TD from a zero-current crossing (ZCC) of the tank current $I_{TANK}$, which is detected by a zero-current detection (ZCD) comparator or circuit that detects these zero-current crossings of the tank current, as will be understood by those skilled in the art. This operation is illustrated in more detail in the signal diagram of FIG. 2 between times t0-t4. A switching cycle or period TSW of the phase voltage signal VHB corresponds to the time interval from a time t0 to a time t4. A TSC control circuit implementing the TSC control activates or drives high the VHB signal at the time t0 (i.e., the HSGD signal turns ON the switch Q1 a dead time DT (not shown in FIG. 2) after the LSGD signal turns OFF switch Q2 in FIG. 1), and the sinusoidal or approximately sinusoidal resonant or tank current $I_{TANK}$ continues increasing as seen in the figure. The dead time DT is a delay time between the turning OFF of the high side power switch Q1 and turning ON of the low side power switch Q2, and the turning OFF of switch Q2 and turning ON of switch Q1, as illustrated in FIG. 4 and as will be discussed in more detail with reference to FIGS. 5 and 6.

At a time t1, a low-to-high zero-current crossing $ZCC_{LH}$ of the tank current $I_{TANK}$ occurs and is detected by the TSC control circuit of the resonant converter implementing the TSC method of control. In response to this detected zero current (i.e., the detection of the zero-current crossing $ZCC_{LH}$) of the tank current $I_{TANK}$, after the delay time DT the TSC control circuit toggles or switches the switching circuit to the complementary state, which in this situation corresponds to deactivating the VHB signal (e.g., driving the HSGD signal inactive to turn OFF the switch Q1 and driving the LSGD signal active to turn ON the switch Q2 in FIG. 1). This deactivation of the VHB signal occurs a delay time TD after the detection of the zero-current crossing $ZCC_{LH}$, which occurs at a time t2 in FIG. 2. As indicated in FIG. 2, the time t2 ideally occurs at one half of the switching cycle TSW or at a duration TSW/2 from the start of the switching cycle at the time t0.

At a time T3, another zero-current crossing of the tank current $I_{TANK}$ occurs in the form of a-high-to-low zero-current crossing $ZCC_{HL}$. Once again, the TSC control circuit detects the zero-current crossing $ZCC_{HL}$ of the tank current $I_{TANK}$ and, in response to this detected zero current, the TSC control circuit again toggles or switches the switching circuit after the delay time TD to the complementary state. In this situation, the complementary state corresponds to activating the VHB signal (e.g., driving the HSGD signal active to turn ON the switch Q1 and driving the LSGD signal inactive to turn OFF the switch Q2 in FIG. 1). This activation of the VHB signal ideally occurs the delay time TD after the detection of the zero-current crossing $ZCC_{HL}$ at the time t4 in FIG. 2 where the duration between the time t2 to time t4 is ideally equal to one half of the switching cycle TSW/2. Conventional TSC control is described in more detail in C. Adragna, D. Ciambellotti, M. Dell'Oro, F. Gallenda, "Digital Implementation and Performance Evaluation of a Time-Shift-Controlled LLC Resonant Half-Bridge Converter", 2014 IEEE Applied Power Electronics Conference and Exposition—APEC 2014, pp 2074-2080, 2014, which is incorporated herein by reference it entirety.

Turning now to FIG. 3, the effects of unbalanced or asymmetric operation in detecting zero current crossings ZCC in the TSC method of FIG. 2 are illustrated. The TSC control circuitry implementing the TSC control includes a zero-current detection (ZCD) comparator for detecting these zero-current crossings ZCC of the tank current $I_{TANK}$. The ZCD comparator generates a zero-current detection signal ZCD in response to detecting a zero-current crossing ZCC. Unfortunately, due to the inherent operating characteristics of such a ZCD comparator, the comparator typically exhibits unbalanced or asymmetric operational characteristics for the detection of the different types of zero-current crossings $ZCC_{LH}$ and $ZCC_{HL}$. As seen in FIGS. 2 and 3, there are two types of zero-current crossings, a low-to-high zero-current crossing $ZCC_{LH}$ and a high-to-low zero-current crossing $ZCC_{HL}$. Ideally the ZCD comparator would detect each of these zero-current crossings ZCC and generate the ZCD signal in the identical way for each type of current crossing. This unbalanced or asymmetrical operation of the ZCD comparator manifests itself as a different delay between the occurrence of a zero-current crossing ZCC and the generation of the ZCD signal depending on type of zero-current crossing that has occurred. Thus, the detection of a zero-current crossing ZCC depends on the type of zero-current crossing that has occurred as seen in FIG. 3.

FIG. 3 shows the resonant current $I_{TANK}$ in the upper signal diagram and the ZCD signal generated by the ZCD comparator in the lower signal diagram. A low-to-high zero-current crossing $ZCC_{LH}$ occurs at a time t1 and, in response to this zero-current crossing, the ZCD comparator generates the ZCD signal a first delay time tdel1 later a time t2. A high-to-low zero-current crossing $ZCC_{HL}$ occurs a time t3 and, in response to this zero-current crossing, the ZCD comparator generates the ZCD signal a second delay time tdel2 later a time t4. When the operation of the ZCD comparator is unbalanced or asymmetric, these two delay times tdel1 and tdel2 are not equal as illustrate the figure, with the second delay time tdel2 being longer than the first delay time tdel1 in the example of FIG. 3. Thus, the ZCD comparator operates as if it has two different thresholds for the two different types of zero-current crossings ZCC. These unequal detection times exhibited by the ZCD comparator result in undesirable unbalanced or asymmetric operation of the LLC resonant converter. More specifically, these imbalances or asymmetries result in unbalanced tank current $I_{TANK}$ current which, in turn, causes stresses on components in the LLC resonant converter and a lowering of efficiency the converter, as will be appreciated by those skilled in the art. The unequal thresholds of the ZCD comparator could be adjusted or "trimmed" during testing of the LLC resonant converter 100 to eliminate the unbalanced operation, but this is timing consuming and expensive.

Symmetric time shift control according to embodiments of the present disclosure eliminates these unbalances in the operation of the LLC resonant converter and thereby eliminates or reduces the stresses on components in the converter and improves the efficiency of the converter, as will now be described in more detail. FIG. 4 is a signal timing diagram illustrating signals generated in the LLC resonant converter 100 of FIG. 1 when the symmetric time shift control (STSC) circuitry 104 implements symmetric time shift control (STSC) according to one embodiment of the present disclosure. This STSC control is based on the setting of the time shift of just one of the power switches Q1 or Q2 and then using the same total on time $T_{ON}$, which is based on this time shift, for the other one of the power switches to thereby force symmetric operation of LLC resonant converter 100, as will be described in more detail below. This approach allows utilization of a smaller and less expensive ZCD comparator having less stringent trimming requirements.

In the example embodiment of FIG. 4, the on-time of the low side power switch Q2 is utilized in setting the time shift delay time TD that is utilized in switching both power switches Q1 and Q2. The on-time of the low side power switch Q2 $T_{ONLS}$ is equal to the sum of the delay time TD, a zero-current detection time $T_{ZCD}$ and other inherent delays in the operation of the LLC resonant converter 100. Due to the unbalances or asymmetries discussed above with reference to FIG. 3, the value of the zero-current detection time $T_{ZCD}$, which corresponds to the occurrence of a high-to-low (i.e., negative going) zero-current crossing $ZCC_{HL}$ or low-to-high (i.e., positive going) zero-current crossing $ZCC_{LH}$, can be different for the on-time $T_{ONLS}$ of the low side power switch Q2 and an on-time $T_{ONHS}$ of the high side power switch Q1. Thus, in the approach of the present application the on-time $T_{ONLS}$ of the low side power switch Q2 is detected and then the on-time $T_{ONHS}$ of the high side power switch Q1 is set to the same value as the low side on-time $T_{ONLS}$. In this way, the same zero-current detection time $T_{ZCD}$ is used in the on-times $T_{ONHS}$ and $T_{ONLS}$ for the switches Q1 and Q2.

In FIG. 4, the use of the same on-time for the on-time $T_{ONLS}$ as the on-time $T_{ONHS}$ is represented through the arrow 400. Thus, in operation the on-time $T_{ONLS}$ of the low side power switch Q2 is detected by the control circuitry 104 (FIG. 1) and then the control circuitry utilizes this detected value for the on-time of the low side power switch as the on-time of the high side power switch Q1. As seen in FIG. 4, the on-time $T_{ONLS}$ of the low side power switch Q2 is equal to the sum of the time shift time delay or $T_D$ being utilized by the control circuit 102 in the time shift control of the LLC resonant converter 100 plus a zero current detection time $T_{ZCD}$ to reach the next zero current crossing ZCC plus inherent delays $T_{DEL}$ (not shown in FIG. 4) of components in the LLC resonant converter 100. Thus, the on-time $T_{ONLS}$ illustrated in FIG. 4 is given by the following equation:

$$T_{ONLS} = T_D + T_{ZCD} + T_{DEL} \quad (1)$$

and thus different zero current detection times $T_{ZCD}$ can cause different values for the on-times $T_{ONLS}$ and $T_{ONHS}$. The more detailed operation of the control circuitry 104 in eliminating this asymmetric operation by detecting the on-time $T_{ONLS}$ and then utilizing the same detected value for the on-time $T_{ONHS}$ in controlling the switching circuit 106 will now be described in more detail with reference to FIGS. 5 and 6.

Figure 5:
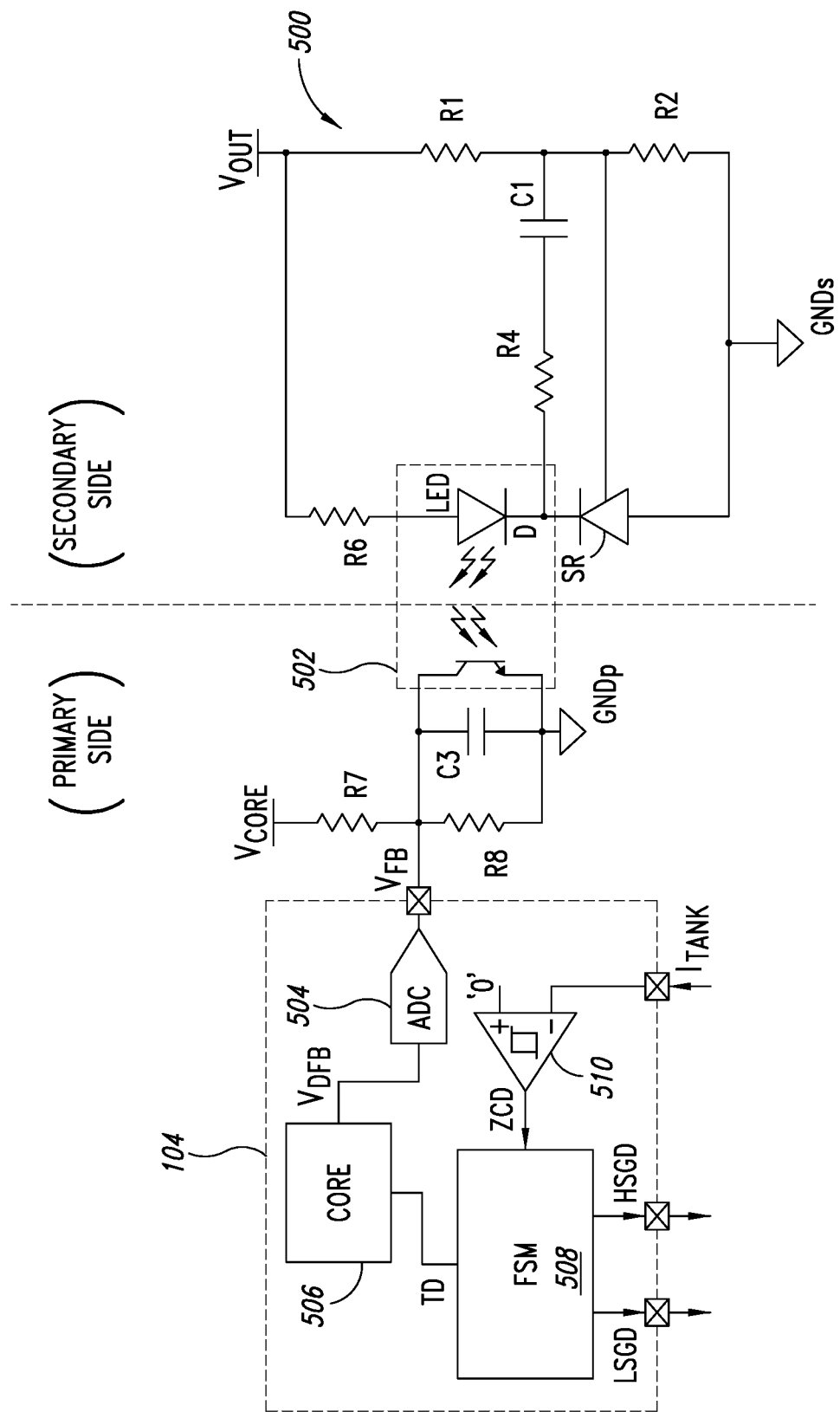
FIG. 5 is a functional block diagram and schematic of the symmetric time shift control circuitry of FIG. 1 according to one embodiment of the present disclosure.

FIG. 5 is a functional block diagram and schematic of the control circuitry 104 of FIG. 1 according to one embodiment of the present disclosure. In the embodiment of FIG. 5, the control circuitry 104 can implement both conventional TSC control and STSC control according to embodiments of the present disclosure. The control circuitry 104 includes an output voltage sensing circuit 500 that senses the output voltage VOUT generated by the LLC resonant converter 100 and provides an input signal indicating the sensed output voltage to an optocoupler 502. The output voltage sensing circuit 500 calculates an error signal of the system indicating a difference between the generated value of the output voltage VOUT and a desired value of this output voltage. This error signal generated by the output voltage sensing circuit is supplied through the optocoupler 502 to the control circuitry 104. In the output voltage sensing circuit 500, the resistors R1 and R2 function as a voltage divider to generate a divided voltage based on the output voltage VOUT. A shunt regulator SR receives the divided voltage and generates an output error voltage based on the divided voltage and thus on the output voltage. This output error voltage is supplied through the optocoupler 502 to the primary side. In the output voltage sensing circuit 500, additional resistors R6, R4 along with resistor R1 and a capacitor C1 define a transfer function of the circuit and there define filtering characteristics of the circuit.

The optocoupler 502 provides electrical isolation between the components of the output voltage sensing circuit 500 and other components on the secondary side of the LLC resonant converter 100 and the control circuitry 104 and other components on the primary side of the resonant converter. In response to the output voltage from the output voltage sensing circuit 500, the optocoupler 502 generates a feedback voltage VFB based on the value of the output voltage VOUT. Series connected resistors R7 and R8 are coupled between a logic supply voltage VCORE and a logic ground GND associated with the control circuit 102, and are coupled to bias the output of the optocoupler 502. A capacitor C3 is also coupled across the output of the optocoupler 502 to filter the generated feedback voltage VFB.

The control circuitry 104 includes an analog-to-digital converter (ADC) 504 that converts the received analog feedback voltage VFB to a corresponding digital value VDFB and supplies this digitized value to core logic circuitry 506. The core logic circuitry 506 calculates the delay time TD for the TSC control of the LLC resonant converter 100 being implemented by the control circuit 102. More specifically, the core logic circuitry 506 calculates the delay time TD based on the following formula:

$$T_D = \alpha V_{FB} \beta \quad (2)$$

where α and β are selected based on a number of considerations utilized in the TSC control method as described in more detail in the Adragna reference previously mentioned and incorporated herein.

The time shift delay time TD calculated by the core logic circuitry 506 is supplied to a finite state machine (FSM) 508 in the control circuitry 104 that utilizes this time shift in generating the LSGD and HSGD signals applied to control the switching of the high side power switch Q1 and low side power switch Q2 in the switching circuit 106 of FIG. 1. The FSM 508 generates the LSGD and HSGD signals to implement STSC control. The FSM 508 or other circuitry in the control circuitry 104 can also implement conventional TSC control so that in this way the control circuitry 104 can implement either TSC control or STSC control in one embodiment of the present disclosure. In addition, the finite state machine 508 also receives the zero-current detection signal ZCD generated by the ZCD comparator 510 in the control circuitry 104. The ZCD comparator 510 has a first non-inverting input coupled to reference voltage, which is ground in the embodiment of FIG. 1 and is represented as a "0" in FIG. 5, while an inverting input of the comparator receives a signal indicating the value of the tank current $I_{TANK}$ in the resonant circuit 108. In the embodiment of FIG. 1, a current sensor S senses the tank current $I_{TANK}$ and supplies the sensed signal indicating or representative of the value of the tank current to the ZCD comparator 510 of FIG. 5. The ZCD comparator 510 then operates as previously described, namely the comparator generates the ZCD signal on its output based on the sensed $I_{TANK}$ current such that the ZCD signal indicates zero current crossings ZCC of the $I_{TANK}$ current in the resonant circuit 108.

Figure 6:
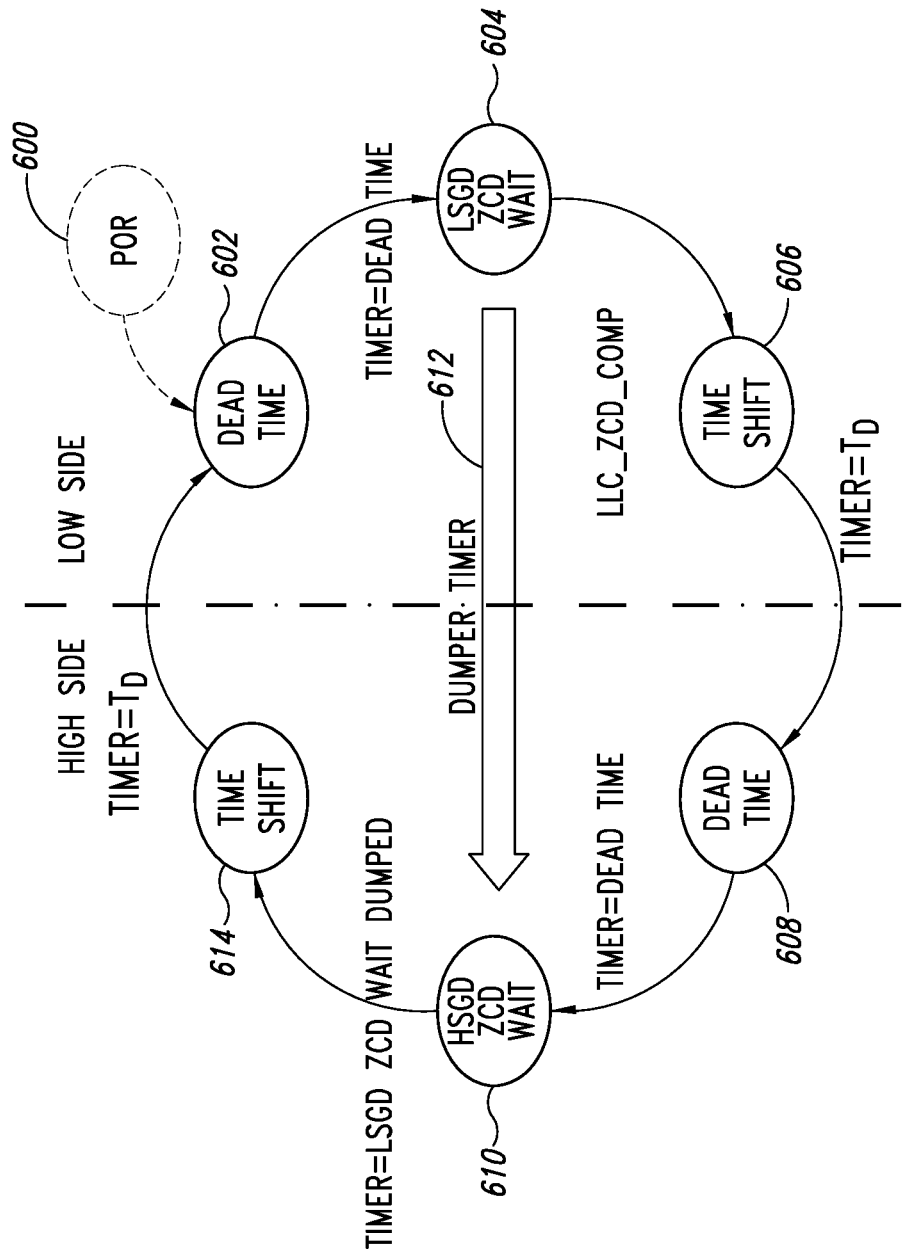
FIG. 6 is a state diagram illustrating the operation of the finite state machine of FIG. 5 according to one embodiment of the present disclosure.

In operation, the finite state machine 508 generates the LSGD and HSGD signals based upon the delay time TD from the core logic circuitry 506 and the ZCD signal from the ZCD comparator 510. In this way, the finite state machine 508 generates the LSGD and HSGD signals as previously described with reference to FIG. 4 to control the switching of the power switches Q1 and Q2 in the switching circuit 106 of FIG. 1. FIG. 6 is a state diagram illustrating the operation of the finite state machine 508 of FIG. 5 in more detail according to one embodiment of the present disclosure. This more detailed operation of the finite state machine 508 in generating the LSGD and HSGD signals will now be described in more detail with reference to FIGS. 4 and 6.

The left-hand side of FIG. 6 illustrates the operation of the finite state machine 508 in generating the HSGD signal to control the high side power switch Q1 while the right hand side illustrates the operation of the finite state machine in generating the LSGD signal to control the low side power switch Q2. Upon initial power up or reset of the LLC resonant converter 100, the finite state machine 508 commences operation in a power-on-reset (POR) state 600 in which various parameters are set to initial values defining initial operation of the LLC resonant converter. From the POR state 600, the finite state machine 508 then enters a dead time state 602 associated with the LSGD and low side power switch Q2. The dead time DT is a delay time between the turning OFF of the high side power switch Q1 and turning ON of the low side power switch Q2, and turning OFF switch Q2 and turning ON switch Q1, as illustrated in FIG. 4 and as will be appreciated by those skilled in the art.

After expiration of the dead time DT in the dead time state 602, the finite state machine 508 activates the LSGD signal to turn ON the low side power switch Q2 and then enters into a low side gate drive zero current detection state (LSGD ZCD STATE) 604. In the state 604, the finite state machine 508 waits for a transition of the ZCD signal from the ZCD comparator 510, which indicates a zero current crossing ZCC of the tank current $I_{TANK}$ has occurred and in this way detects the zero current detection time $T_{ZCD}$ for the low side power switch Q2. The finite state machine 508 saves this detected zero current detection time $T_{ZCD}$ as this same time will be used in controlling the high side power switch Q1, as will be described in more detail below. The finite state machine 508 may, for example, include a timer (not shown in FIG. 5) that starts incrementing upon activation of the low side power switch Q2 after the dead time DT interval of state 602. When the finite state machine 508 detects a transition of the ZCD signal, indicating such a zero current crossing ZCC, the count of the timer indicates the zero current detection time $T_{ZCD}$. The finite state machine 508 may, of course, use approaches other than a timer to calculate or determine the time $T_{ZCD}$. Once the finite state machine 508 detects the transition of the ZCD signal and determined the time $T_{ZCD}$, the finite state machine transitions to a time shift state 606. In the time shift state 606, the finite state machine 508 times the delay time TD and thus the finite machine stays in the time shift state until the time TD has elapsed.

Upon expiration of the time shift delay time TD, the finite state machine 508 then transitions from the time shift state 606 to a dead time state 608 associated with the HSGD signal and the high side power switch Q1. This dead time state 608 corresponds to the rightmost dead time DT indicated in FIG. 4, namely the dead time between deactivating the LSGD signal to turn OFF the low side power switch Q2 and activating the HSGD signal to turn ON the high side power switch Q1. After expiration of the dead time DT in the dead time state 608, the finite state machine 508 then enters into a high side gate drive zero current detection state (HSGD ZCD STATE) 610 in which the finite state machine does not wait for a transition of the ZCD signal from the ZCD comparator 510. Instead, the finite state machine 508 uses the time associated with a zero current crossing ZCC of the tank current $I_{TANK}$ as detected in the LSGD ZCD WAIT state 604 for the low side power switch Q2. This in represented as "dumper timer" arrow 612 in FIG. 6 to indicate the zero current detection time $T_{ZCD}$ detected in state 604, or the count generated by the timer indicating this time, is used by the finite state machine 508 in the state 610. Thus, the transition from the HSGD ZCD WAIT state 610 to TIME SHIFT state 614 does not depend on the ZCD signal generated by the ZCD comparator 510 but instead this transition from state 610 to state 614 depends on the duration of time $T_{ZCD}$ the LSGD ZCD WAIT state 604 has detected and then transferred or "dumped" to the state 610 for use in controlling the on time of the high side power switch Q1. The detection of the zero current crossing ZCC in the LSGD ZCD WAIT state 604 corresponds to the detection of the time $T_{ZCD}$ in FIG. 4 as previously discussed, and thus this same time is used in the HSGD ZCD WAIT state 610 instead of basing the duration or time $T_{ZCD}$ of the state 610 on the ZCD signal from the comparator 610. In this way, the finite state machine 508 makes the on time of the high side power switch Q1 equal to the on time of the low side power switch Q2 as indicated in by the arrow 400 in FIG. 4.

Upon expiration of the dumped time (i.e., the time $T_{ZCD}$ detected in state 604), the finite state machine 508 transitions from state 610 to time shift state 614. In the time shift state 614, the finite state machine 508 again times the time shift delay time TD just as in the state 606, and thus the finite machine stays in the time shift state 614 until the time TD has elapsed. Upon expiration of the time TD in the state 614, the finite state machine 508 transition again to the state 602. The finite state machine 508 continues this operation, alternately operating in states 602-606 and states 608-614 to control the operation of the low side and high side power switches Q2 and Q1, respectively. In this way, the same time $T_{ZCD}$ is used for control of the low side and high side switches Q2 and Q1 and the control of these switches is thus "symmetric," which is the reason this control has been referred to as symmetric time shift control in the present application.

Embodiments of the present application are not limited to the example embodiments of FIGS. 4-6. For example, in alternative embodiments the approach is reversed, namely the on-time $T_{ONHS}$ of the high side power switch Q1 could be detected and then used to set the on-time $T_{ONLS}$ of the low side power switch Q2. The same is true for other alternative embodiments of the switching circuit 106 where the switching circuit is not a half-bridge circuit but is a full-bridge circuit or other suitable type of switching circuit. Whatever the specific structure of the switching circuit 106, the on-time of one of the switching states of the switching circuit 106 is detected and then used in controlling the other switching states of the switching circuit according to embodiments of the present disclosure. Regarding the finite state machine 508, the finite state machine can be formed from one or more of hardware, software and firmware, as will be appreciated by those skilled in the art. Where the finite state machine 508 is implemented purely in hardware this hardware can also be formed purely from analog circuitry, purely from digital circuitry, or from a combination of both digital and analog circuitry. The entire control circuit 104, which includes the finite state machine 508, may similarly be formed from one or more of hardware, software and firmware, and where implemented purely in hardware this hardware may include purely analog circuitry, purely digital circuitry, or a combination of both digital and analog circuitry.

Figure 7:
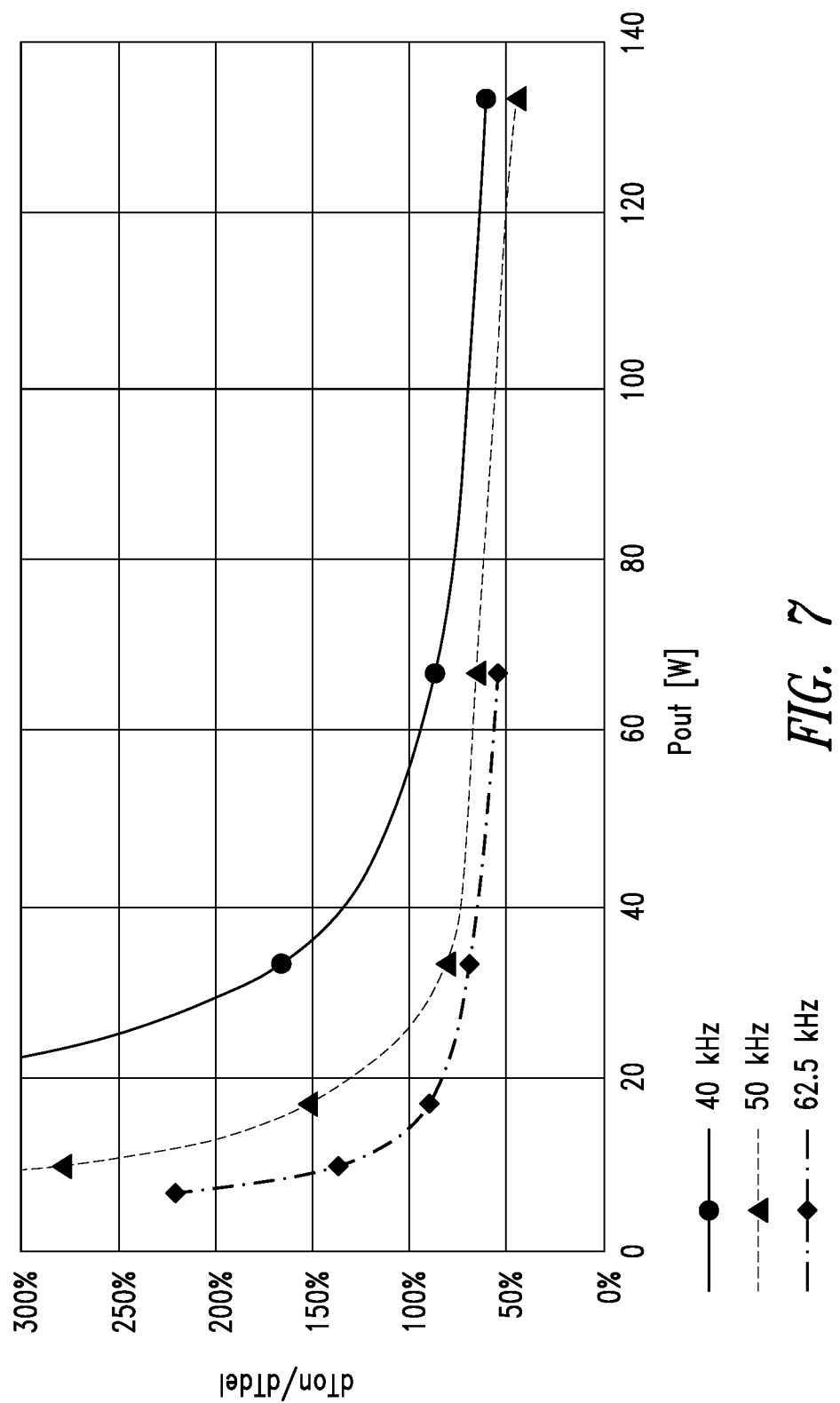
FIG. 7 is a graph illustrating unbalanced gain as a function of frequency that may be present in LLC resonant converters utilizing conventional time shift control.

FIG. 7 is a graph illustrating unbalanced gain as a function of frequency that may be present in LLC resonant converters utilizing conventional time shift control, as will now be explained in more detail with reference to rectification circuit 110 of FIG. 1. An LLC resonant converter is required to operate at a 50% duty cycle to balance the currents through the output rectification diodes D1 and D2. Unbalances may result from mismatched delays in the drivers of converter, mismatches in operation of an oscillator (not shown) that is part of the control circuitry of a conventional LLC resonant converter, and, in the case of the resonant converter being controlled through time shift control, mismatches or unbalanced operation in delay or offset the ZCD comparator that detect zero current crossings of the tank current $I_{TANK}$ in the resonant circuit 108.

In time shift control, the on-time of each of the drivers (e.g., power switches Q1 and Q2 in FIG. 1) is determined by the sum of the time shift delay time TD, the time to reach current zero crossing in the form of the detected zero current detection time $T_{ZCD}$, and delays in the system TDEL, as previously discussed. Any unbalance in the on-times causes an asymmetry in the tank current $I_{TANK}$, the time $T_{ZCD}$ during high side on and low side operation on can be different and either increase or decrease the effect of a delay unbalance. The unbalanced gain can be defined as follows:

$$G_{UNBAL} = \frac{\partial \Delta T_{ON}}{\partial T_{DEL}} = \frac{\partial (T_{ONLS} - T_{ONHS})}{\partial (T_{del1} - T_{del2})} \quad (3)$$

where the on-time TON is difference of the on-times of the high-side and low-side states. An analytical calculation of unbalanced gain $G_{UNBAL}$ would require an accurate derivation of the waveform of the tank current $I_{TANK}$, which is a complex task. As a result, the inventors of the present application extracted an approximation of waveform of the $I_{TANK}$ current through simulation on a converter model. This convert model uses time shift control and applies an asymmetric delay of the ZCD comparator. The unbalance of the on time TON is measured for different frequency and load conditions and results of these measurements are shown in the graph of FIG. 7.

Referring to FIG. 7, when the unbalance gain $G_{UNBAL}$ is greater than 1 (i.e., greater than 100% in FIG. 7), the time shift control is amplifying the timing unbalances in the converter. This includes asymmetries or unbalances coming from both the ZCD comparator and from the drivers or oscillator components in the resonant converter. The time shift control method in fact adds, when compared to the direct frequency control method previously discussed, one more source of asymmetry or unbalance to the operation of the resonant converter, namely the ZCD comparator itself. The graph shows that for high loads (i.e., increasing output power $P_{out}$ of the resonant converter along the horizontal axis) and above resonance, the time shift control tends to soften the effects of the asymmetries in the system, improving the balance of the tank current $I_{TANK}$ on the output windings S1, S2 (FIG. 1). Conversely, for low output power $P_{out}$ or light loads, especially below resonance, the asymmetries can be strongly amplified, up to the point where only one output winding S1, S2 is delivering all the output current. The graphs of FIG. 7 are based on a system having a resonant frequency of 50 kHz.

Figure 8:
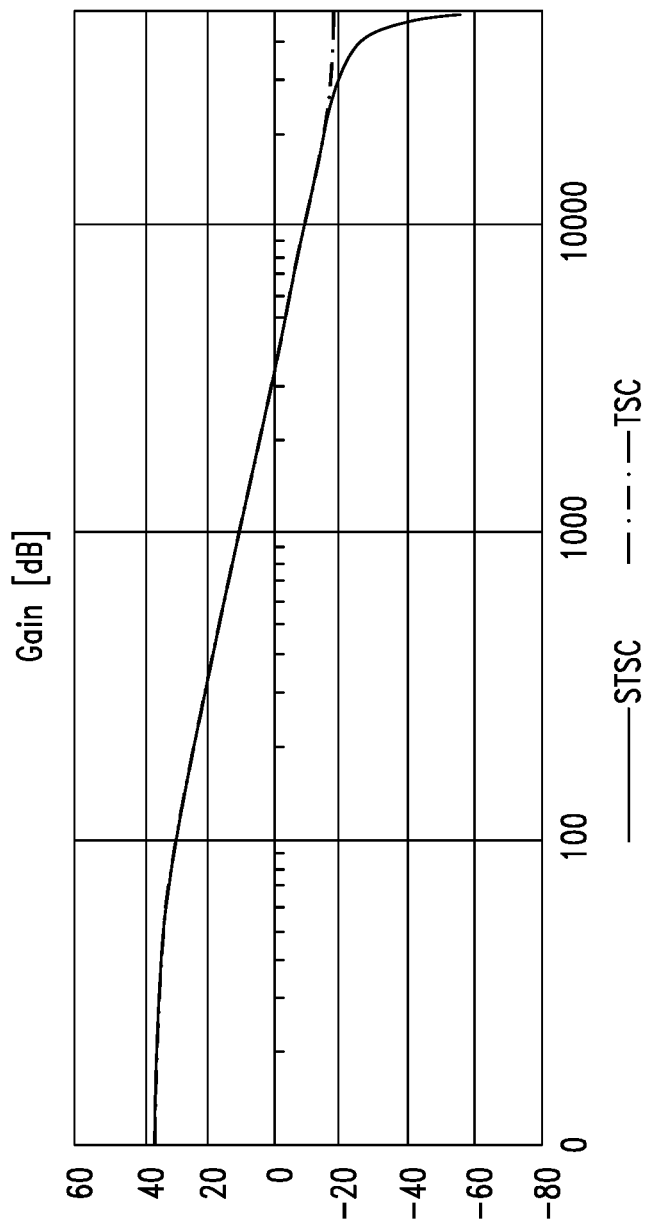
FIG. 8 is graph showing the loop gain of an LLC resonant converter using conventional time shift control and the loop gain of such a converter using symmetric time shift control according to embodiments of the present disclosure.

FIG. 8 is graph showing the loop gain of an LLC resonant converter using conventional time shift control and the loop gain of such a converter using symmetric time shift control according to embodiments of the present disclosure. Loop gain is shown on the vertical axis and frequency on the horizontal axis. The STSC control method differs from the TSC control method only for the calculation of the high side on time $T_{ONHS}$ and thus the dynamic behavior of the resonant converter implementing STSC control would be expected to be similar to that of a converter implementing TSC control, at least at low to medium frequencies. To confirm this expectation, closed loop models of both a TSC and a STSC converter system were developed and loop gain was simulated as shown in FIG. 8. As seen in this figure, the loop gains are very similar and thus symmetric time shift control, as implemented in the LLC resonant converter 100 of FIG. 1 as described above, does not adversely affect the loop gain of the converter.

Figure 9:
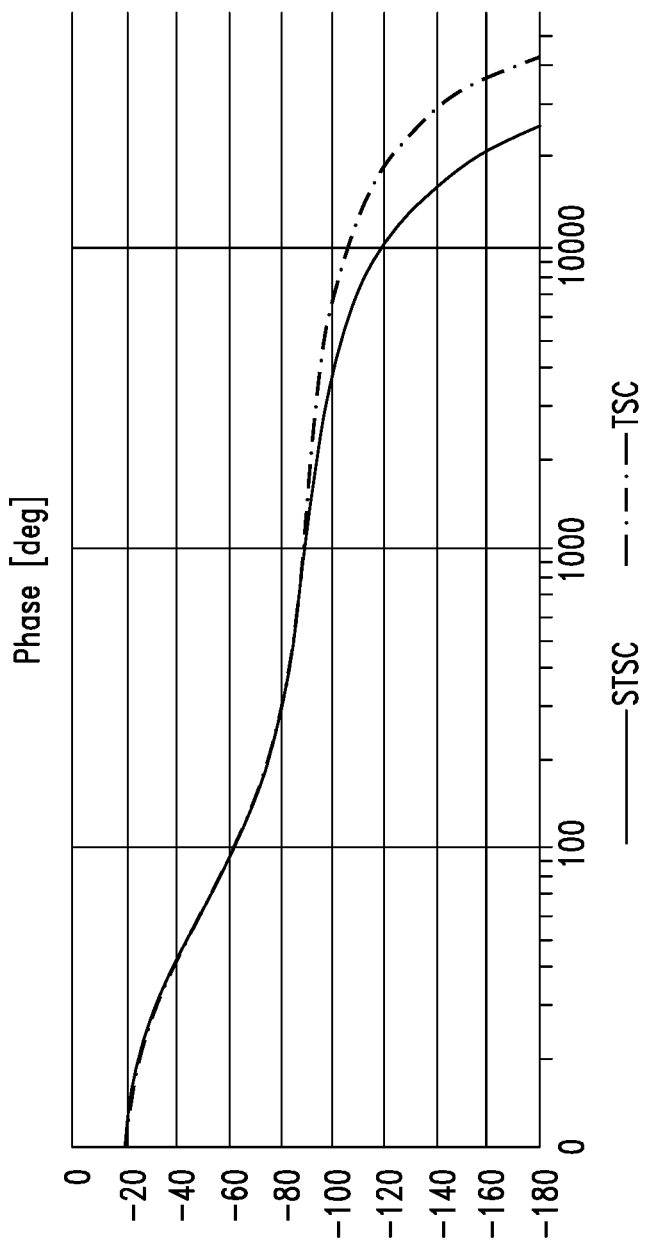
FIG. 9 is graph showing the phase shift of an LLC resonant converter using conventional time shift control and the phase shift of such a converter using symmetric time shift control according to one embodiment of the present disclosure.

The same is true for the phase shift characteristics of a resonant converter implementing STSC control as illustrated in FIG. 9. FIG. 9 is graph showing the phase shift of an LLC resonant converter as a function frequency using conventional time shift control and the phase shift of such a converter using symmetric time shift control. FIG. 9 shows for the phase shift, just as FIG. 8 does for the loop gain, that the gain and the phase of the resonant converter are essentially the same, at least at low to medium frequencies, for both TSC and STSC control methods. Both gain and phase characteristics with STSC control are still single pole systems, as is true for TSC control, except with STSC control the curves drop off at a slightly lower frequency as seen on the right hand side of each graph.

Figure 10:
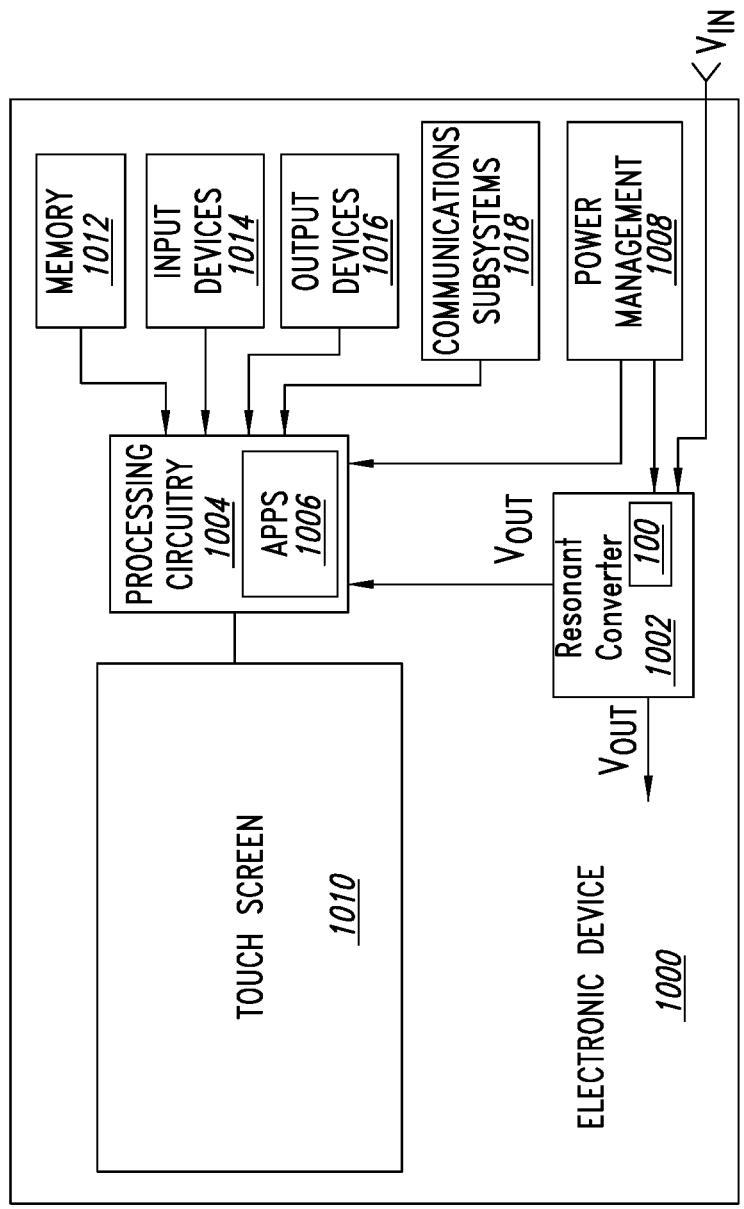
FIG. 10 is a functional block diagram of an electronic device including a voltage converter such as the LLC resonant converter of FIG. 1 including the driver control circuitry of FIG. 8 according to a further embodiment of the present disclosure.

FIG. 10 is a functional block diagram of an electronic device 1000 including a resonant power converter 1002, such as the LLC resonant converter 100 of FIG. 1, that implements symmetric time shift control according to a further embodiment of the present disclosure. The electronic device 1000 in the example embodiment of FIG. 11 includes processing circuitry 1004 that controls the overall operation of the electronic device 1000 and also executes applications or "apps" 1006 that provide specific functionality for a user of the electronic device. In operation, the resonant converter 1002 generates an output voltage Vout from an input voltage VIN supplied to the electronic device 1000. The input voltage VIN may be an AC voltage that is then rectified or may be a DC input voltage from an external power supply (not shown in FIG. 10). The electronic device 1000 may be any type of electronic device, such as a smart phone, a tablet computer, a laptop computer, and so on.

A power management subsystem 1008 of the electronic device 1000 is coupled to the processing circuitry 1004 and would typically include a battery for powering the electronic device, and also control circuitry for controlling power-related operating modes of the device such as charging of the battery, power-savings modes, and so on. The output voltage Vout generated by the voltage converter 1002 is supplied to the power management subsystem 1008 and other components in the electronic device 1000 as required. The electronic device 1000 further includes a video component such as a touch screen 1010 with a touch display (not shown) such as a liquid crystal display (LCD) and a touch panel (not shown) attached to or formed as an integral part of the touch display. In operation, the touch screen 1010 senses touches of a user of the electronic device 100 and provides sensed touch information to the processing circuitry 1004 to thereby allow the user to interface with and control the operation of the electronic device. The processing circuitry 1004 also controls the touch screen 1010 to display desired visual content on the touch display portion of the touch screen.

The electronic device 1000 further includes data storage or memory 1012 coupled to the processing circuitry 1004 for storing and retrieving data including the apps 1006 and other software executing on the processing circuitry and utilized by the electronic device 1000 during operation. Examples of typical types of memory 1012 include solid state memory such as DRAM, SRAM and FLASH, solid state drives (SSDs), and may include any other types of memory suited to the desired functionality of the electronic device 1000 including digital video disks (DVDs), compact disk read-only (CD-ROMs), compact disk read-write (CD-RW) memories, magnetic tape, hard and floppy magnetic disks, tape cassettes, and so on. Input devices 1014 are coupled to the processing circuitry 1004 and may include a keypad, whether implemented through the touch screen 1010 or separately, a pressure sensor, accelerometer, microphone, keyboard, mouse, digital camera to capture still and video images, and other suitable input devices. Output devices 1016 are also coupled to the processing circuitry 1004 and may include, for example, audio output devices such as a speaker, printer, vibration device, and so on. The input devices 1014 and output devices 1016 collectively may include other types of typical communications ports for the electronic device 1000, such as USB ports, HDMI ports, and so on. The electronic device 1000 further includes communications subsystems 1018 coupled to the processing circuitry 1004 and which may include Wi-Fi, GPS, cellular and Bluetooth subsystems for providing the device with the corresponding functionality. The specific type and number of input devices 1014, output devices 1016, communications subsystems 1018, and even the specific functionality of the power management subsystem 1008 will of course depend on the type of the electronic device 1000.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit configured to control a switching circuit of a resonant converter, the switching circuit including a first power switch and a second power switch coupled to a resonant circuit and the control circuit configured to control a first on time period of the first power switch and a second on time period of the second power switch to generate a square wave signal to drive the resonant circuit, the control circuit configured to set the first on time period to a sum of at least a zero current detection time period, ending at a detection of a zero current crossing of a resonant current generated in the resonant circuit in response to the square wave signal, and on a time shift delay time period that is based on an output voltage of the resonant converter, and the control circuit further configured to set the second on time period of the second power switch to the sum of the at least the zero current detection time period utilized to set the first on time period of the first power switch and the time shift delay time period utilized to set the first on time period.

2. The control circuit of claim 1, wherein the control circuit comprises a zero current detection comparator coupled to the resonant circuit and configured to detect zero current crossings of the resonant current and to generate a zero current detection signal based on the detected zero current crossings.

3. The control circuit of claim 2, wherein the control circuit further comprises a finite state machine coupled to the zero current detection comparator to receive the zero current detection signal and coupled to receive the time shift delay time period, and the finite state machine configured to set the first and second on time periods of the first and second power switches, respectively, based on the zero current detection signal and the time shift delay time period.

4. The control circuit of claim 3, wherein the finite state machine is further configured to set the first on time period of the first power switch by first timing a first dead time period corresponding to a time between a switching off of the second power switch and a switching on of the first power switch, and to turn on the first power switch upon expiration of the first dead time period and, after having turned on the first power switch, to detect the zero current crossing of the resonant current and determine the zero current detection time period based on the detected zero current crossing, and to save the determined zero current detection time period and to delay the time shift delay time period after the detected zero current crossing and to turn off the first power switch upon expiration of the time shift delay time period.

5. The control circuit of claim 4, wherein the finite state machine is further configured to set the second on time of the second power switch by first timing a second dead time period corresponding to a time between a switching off of the first power switch and a switching on of the second power switch, and to turn on the second power switch upon expiration of the second dead time period and, after having turned on the second power switch, to time the detected zero current detection time period and, upon expiration of the detected zero current detection time period, and to delay the time shift delay time period after expiration of the zero current detection time period and turn off the second power switch upon expiration of the time shift delay time period.

6. The control circuit of claim 4, wherein the finite state machine comprises a timer to generate a count indicating the detected zero current detection time period.

7. The control circuit of claim 1, wherein the switching circuit comprises a half-bridge circuit including a low-side power switch formed by the first power switch and a high-side power switch formed by the second power switch.

8. The control circuit of claim 7, wherein each of the low-side and high-side power switches comprises a MOSFET.

9. The control circuit of claim 8, wherein the switching circuit further comprises third and fourth power switches coupled to the high-side and low-side power switches, respectively, to form a full-bridge circuit.

10. The control circuit of claim 1, wherein the resonant circuit comprises two inductive elements L and a capacitive element C coupled in series so that the resonant converter comprises an LLC resonant converter.

11. The control circuit of claim 10, wherein the two inductive elements are integrated in a single transformer structure.

12. The control circuit of claim 1, wherein the control circuit is formed purely from analog circuitry.

13. The resonant converter of claim 12, wherein the control circuit comprises:
a zero current detection comparator coupled to the resonant circuit and configured to detect zero current crossings of the resonant current and to generate a zero current detection signal based on the detected zero current crossings;
a finite state machine coupled to the zero current detection comparator and configured to receive the zero current detection signal and coupled to receive the time shift delay time period, and the finite state machine configured to set the first and second on time periods of the first and second power switches, respectively, based on the zero current detection signal and the time shift delay time period;
an optocoupler having an input coupled to the output node and configured to generate an optical signal based on the output voltage and to generate an electrical feedback voltage signal based on the generated optical signal;
an analog-to-digital converter coupled to the optocoupler and configured to receive the electrical feedback voltage signal and to convert the electrical feedback voltage signal to a digital feedback voltage value; and
core logic circuitry coupled to the analog-to-digital converter and configured to receive the digital feedback voltage and to generate the time shift delay time period based on the digital feedback voltage value.

14. The resonant converter of claim 13, wherein each of the power switches comprises a MOSFET.

15. A resonant converter, comprising:
a half-bridge circuit including first and second power switches and a phase node defined at an interconnection of the first and second power switches;
a resonant circuit including a transformer having a primary side and a secondary side, the primary side coupled to the resonant circuit;
a rectification circuit coupled to the secondary side of the transformer and coupled to an output node; and
a control circuit configured to control the half-bridge circuit to control a first on time period of the first power switch and a second on time period of the second power switch to generate a signal on the phase node to drive the resonant circuit and thereby generate an output voltage on the output node, and the control circuit configured to set the first on time period to a sum of at least zero current detection time period, ending at a detection of a zero current crossing of a resonant current generated in the resonant circuit in response to the signal on the phase node and on a time shift delay time period that is based on an output voltage on the output node, and the control circuit further configured to set the second on time period of the second power switch to equal the first on time period of the first power switch.

16. The resonant converter of claim 15, wherein the transformer includes a winding in the primary side that forms a resonant inductive element of the resonant circuit.

17. The resonant converter of claim 16, wherein the resonant circuit further comprises a resonant inductor coupled to the winding in the primary side of the transformer.

18. The resonant converter of claim 15, wherein the transformer comprises a center tap transformer including on the secondary side first and second secondary windings coupled to the output node.

19. The resonant converter of claim 18, wherein the rectification circuit comprises first and second rectification elements coupled to the first and second secondary windings, respectively.

20. The resonant converter of claim 19, wherein each of the first and second rectification elements comprises one of a diode and a synchronous rectification switch.

21. A method of controlling a resonant converter, comprising:
    setting first and second on time periods of first and second power switches, respectively, and first and second off time periods of the first and second power switches, respectively, to drive a resonant circuit to generate a resonant current in the resonant circuit; and
    generating an output voltage based on the resonant current in the resonant circuit, wherein setting the first and second on time periods includes:
        setting the first on time period of the first power switch to a sum of at least a zero current detection time period, ending at a zero current crossing of the resonant current, and a time shift delay time period that is based on the output voltage; and
        setting the second on time period of the second power switch to the sum of the at least the zero current detection time period used to set the first on time period and the time shift delay time period utilized to set the first on time period.

22. The method of claim 21 further comprising:
    detecting zero current crossings of the resonant current;
    setting the on time period of the first power switch by:
        timing a first dead time period corresponding to a time between a switching off of the second power switch and a switching on of the first power switch,
        turning on the first power switch upon expiration of the first dead time period,
        detecting the zero current crossing of the resonant current after having turned on the first power switch,
        determining the zero current detection time period based on the detected zero current crossing,
        storing the determined zero current detection time period,
        delaying the time shift delay time period after the detected zero current crossing, and
        turning off the first power switch upon expiration of the time shift delay time period.

23. The method of claim 22 further comprising:
    setting the on time period of the second power switch by,
        timing a second dead time period corresponding to a time between a switching off of the first power switch and a switching on of the second power switch,
        turning on the second power switch upon expiration of the second dead time period,
        timing the previously stored detected zero current detection time period after having turned on the second power switch,
        delaying the time shift delay time period after expiration of the zero current detection time period, and
        turning off the second power switch upon expiration of the time shift delay time period.

24. The method of claim 21, wherein generating an output voltage based on the resonant current in the resonant circuit comprises rectifying signals generated in response to the resonant current in the resonant circuit.

25. The method of claim 21 further comprising generating the time shift delay time period based on the output voltage.

* * * * *